(12) United States Patent
Waddell

(10) Patent No.: US 7,823,901 B2
(45) Date of Patent: Nov. 2, 2010

(54) FOLD-UP TRAILER

(76) Inventor: William D. Waddell, 650 N. Rose Dr., #302, Placentia, CA (US) 92870

(*) Notice: Subject to any disclaimer, the term of this patent is extended or adjusted under 35 U.S.C. 154(b) by 57 days.

(21) Appl. No.: 12/154,044

(22) Filed: May 20, 2008

(65) Prior Publication Data

US 2009/0289438 A1  Nov. 26, 2009

(51) Int. Cl.
*B62D 63/06* (2006.01)
(52) U.S. Cl. .................. 280/401; 280/491.1
(58) Field of Classification Search ........... 280/491.1, 280/401, 656, 638; 296/57.1; 414/462, 537; 224/401
See application file for complete search history.

(56) References Cited

U.S. PATENT DOCUMENTS

| | | | |
|---|---|---|---|
| 2,080,709 A | | 8/1935 | Hall et al. |
| 2,809,046 A | | 10/1957 | Anderson |
| 3,885,691 A | * | 5/1975 | Knapp ................. 414/495 |
| 4,268,209 A | * | 5/1981 | Westerman ............ 414/462 |
| D336,869 S | | 6/1993 | Leib et al. |
| 5,354,090 A | * | 10/1994 | Grovom ................ 280/656 |
| 5,607,176 A | | 3/1997 | Leib et al. |
| 6,254,117 B1 | * | 7/2001 | Cross ................... 280/401 |
| 6,524,056 B1 | * | 2/2003 | Kloster ................. 414/538 |
| 6,623,028 B1 | * | 9/2003 | Johnston ............... 280/656 |
| 6,767,025 B2 | | 7/2004 | Hagen |
| 7,055,848 B1 | * | 6/2006 | James .................. 280/656 |
| 7,419,204 B2 | * | 9/2008 | Coble et al. ........... 296/57.1 |
| 7,484,749 B1 | * | 2/2009 | Doyle et al. ........... 280/460.1 |
| 7,651,117 B1 | * | 1/2010 | McGee ................. 280/656 |
| 2003/0222431 A1 | * | 12/2003 | Crosby et al. .......... 280/656 |
| 2004/0061313 A1 | * | 4/2004 | Courtney .............. 280/656 |
| 2004/0120799 A1 | * | 6/2004 | Kessler ................ 414/537 |
| 2006/0181063 A1 | * | 8/2006 | Eddings ............... 280/656 |

* cited by examiner

*Primary Examiner*—Tony H. Winner

(57) ABSTRACT

A novel trailer for use in hauling loads behind a motor vehicle is disclosed, where the trailer is of the fold-up type and includes a slidable bed that can extend and retract, at least one winch with cable attached to the slidably bed for operation between a use position and a stored position, a suspension system with wheels and tires for rolling support of the trailer when being towed, a hitch for connecting the trailer to the motor vehicle, and a hinge for cooperation in allowing the rotatable transitioning of the slidable bed. In an alternate version, a trailer includes a primary bed and a secondary bed that are telescopically slidable into a stored position underneath the motor vehicle.

7 Claims, 7 Drawing Sheets

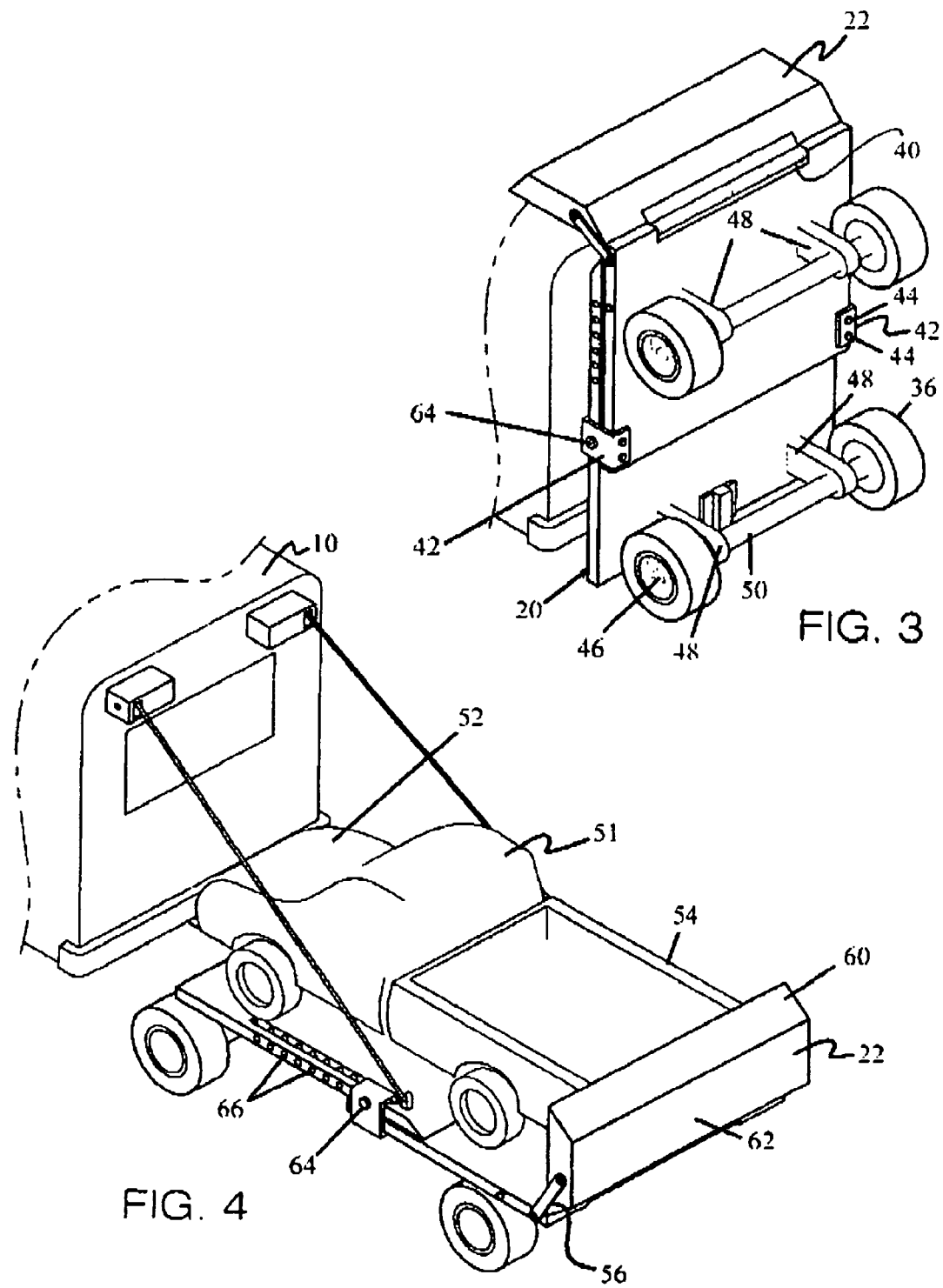

ND-UP TRAILER

RELATED APPLICATIONS

Not applicable.

STATEMENT REGARDING
GOVERNMENTALLY FUNDED WORK

Not applicable.

BACKGROUND OF THE INVENTION

The present invention relates to trailers for towing behind a motor vehicle. More specifically, the present invention relates to trailers that fold into a storage position while hitched to a motor vehicle. In addition, the present invention relates to a folding trailer that has an extendable bed that can be adjusted to accommodate different sized loads.

Trailers are essentially analogous to the wagons that were commonly used in commerce in the 19$^{th}$ century and earlier times. In the usual case, the wagon was hitched to a horse, or a team of horses, and served to transports loads of various kinds from point to point. As horses were replaced with motor vehicles, the usage of wagons also adapted and trailers were hitched to a motor vehicle to provide the same transportation service as before.

Over time, trailers evolved to fit various needs. Tasks as diverse as moving furniture to hauling logs were handled through the use of trailers. The availability of a convenient means to transport items was a boon for many reasons and purposes and the usage of trailers has become ubiquitous. This is not to say that all problems associated with the use of trailers and the various applications in which trailers can be used has been solved. One example of such a situation is the difficulty of dealing with a trailer that is unloaded but is still hitched to a motor vehicle. In just one example, a situation like this is typically very difficult for the driver to manage since the added length makes driving and maneuvering more complicated. As will be seen below, there remain significant deficits regarding the actual usage of trailers under different conditions and circumstances.

In U.S. Pat. No. 5,607,176 (Leib, et al) a collapsible trailer is shown that has a bifurcated bed that can be folded in order to shorten the length of the trailer for storage purposes. Leib does not solve the problems associated with towing an unloaded trailer that follows behind a motor vehicle. U.S. Pat. No. Des. 336,869 (Leib, et al) is the identical concept except covered from the design standpoint. In U.S. Pat. No. 6,767,025 (Hagen) discloses a folding trailer that is hitchable to a motor vehicle. Hagen's invention does have a bed that folds and then can be articulated to a point on the tongue structure where the bed is maintained above the ground and in a position closer to the rear of the motor vehicle. Leib does not solve the problem of significantly minimizing the overall length of the motor vehicle and trailer combination and Lieb does not provide for adjustable extensions of the bed to accommodate different sized loads. Similarly, in U.S. Pat. No. 6,254,117 (Cross) a fold-up trailer for use with an ATV (All Terrain Vehicle) is shown. Cross is dealing with a lightweight trailer bed, suspension and wheels, which are not suited for typically roadway duty as a trailer.

The folding trailer of U.S. Pat. No. 2,080,709 (Hall, et al) teaches a different approach where the trailer bed is foldable into a compact size that is stored on the rear of the motor vehicle in a storage housing. Hall does generate some real benefits in terms of the compact result when the trailer is stored, but the approach is severely limited and certainly does not possess the capacity of a standard trailer. Similar in concept to Hall, U.S. Pat. No. 2,809,046 (Andersson) teaches the use of a foldable trailer bed that can be stowed in a housing on the bumper of a motor vehicle.

SUMMARY OF THE INVENTION

A novel trailer is disclosed where a fold-up trailer includes a primary bed with a set of wheels and tires mounted thereon, a secondary bed with a set of wheels and tires mounted thereon, where the fold-up trailer is positionable between a stored position and a use position when in the stored position, the trailer is compatibly sized to fit in close proximity with the motor vehicle and when in the use position the trailer sets on the ground. The trailer of the present invention further includes a tongue that is compatible with hitching to the motor vehicle and where the tongue includes hinge that is rotatable and which allows the fold-up trailer to move between the use position and the stored position by means of at least a winch.

The primary bed of the present invention is slidably engaged with the secondary bed and when in the use position the secondary bed can be adjusted to fit the size of the load and overall the primary bed and the secondary bed form a slidable bed portion. In the stored position, the slidable bed is oriented with the secondary bed retracted to form the shortest slidable bed portion, and conversely, when the slidable bed is in its use position the secondary bed is extended to the extent needed to accommodate the load, up to the point of full extension of the secondary bed.

In an alternate embodiment the trailer of the present invention may be telescopically stored underneath the motor vehicle to the extent the undercarriage of the motor vehicle allows for clearance.

BRIEF DESCRIPTION OF THE DRAWINGS

FIG. 3 is a partial isometric view of a motor vehicle and the fold-up trailer of the present invention, where the fold-up trailer is shown in the stored position and the slidable bed is in the fully closed position.

FIG. 4 is the same fold-up trailer as shown in FIG. 3, except the fold-up trailer is shown in the use position and the slidable bed is shown in an extended position.

FIG. 12 is the motor vehicle and trailer of FIG. 11 showing the secondary bed transitioned into the stored position with the ramp in the extending there from.

DETAILED DESCRIPTION OF THE PREFERRED EMBODIMENTS

Figure 1:
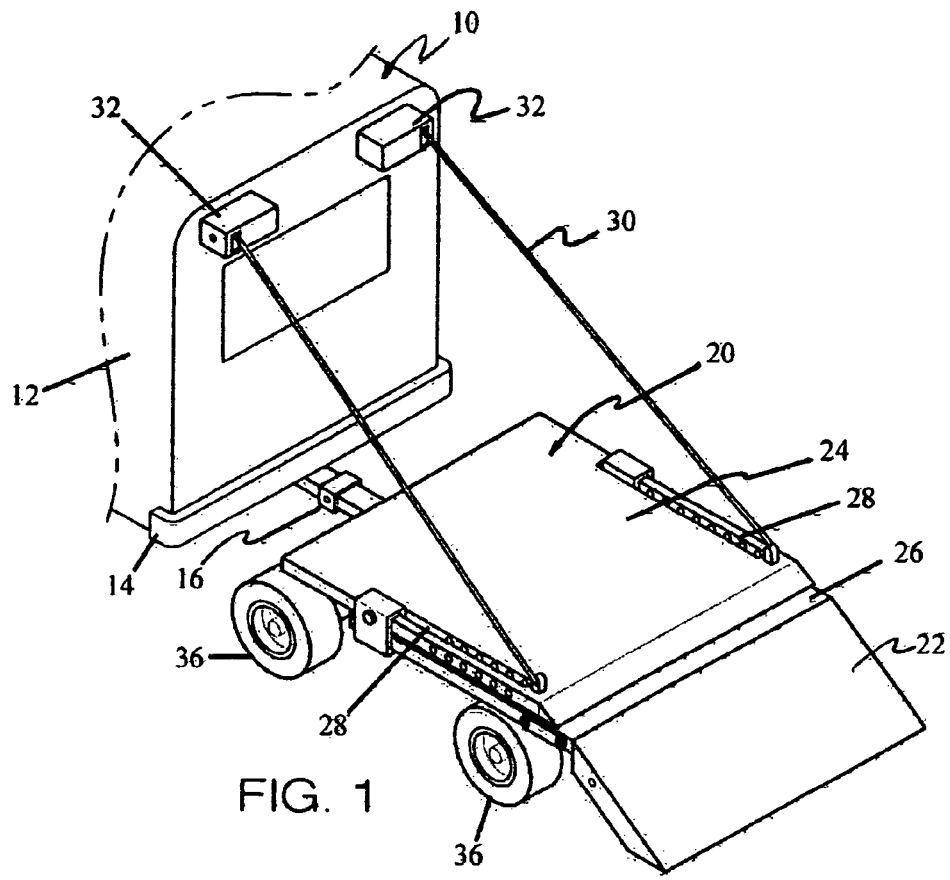
FIG. 1 is a partial isometric view of a motor vehicle with the fold-up trailer of the present invention attached thereto, with the fold-up trailer being shown in the use position.

A novel trailer is disclosed below and in the drawings, comprising a particular type of trailer for use in hitching to motor vehicles, namely a fold-up trailer that folds up when not in use. This type of trailer has only rarely occurred in the prior art and the versions that have been studied have limitations such as versions that fold-up for easier storage within in a garage, or that fold-up into housings attached to the rear of a motor vehicle. The fold-up trailer of the present invention is set apart from these prior art trailers in that it has multiple functions that allow the trailer to remain installed onto the motor vehicle in a compact and safe fashion, while still providing service as a robust heavy duty trailer. The particulars of the present invention will be discussed in more detail herein.

Figure 2:
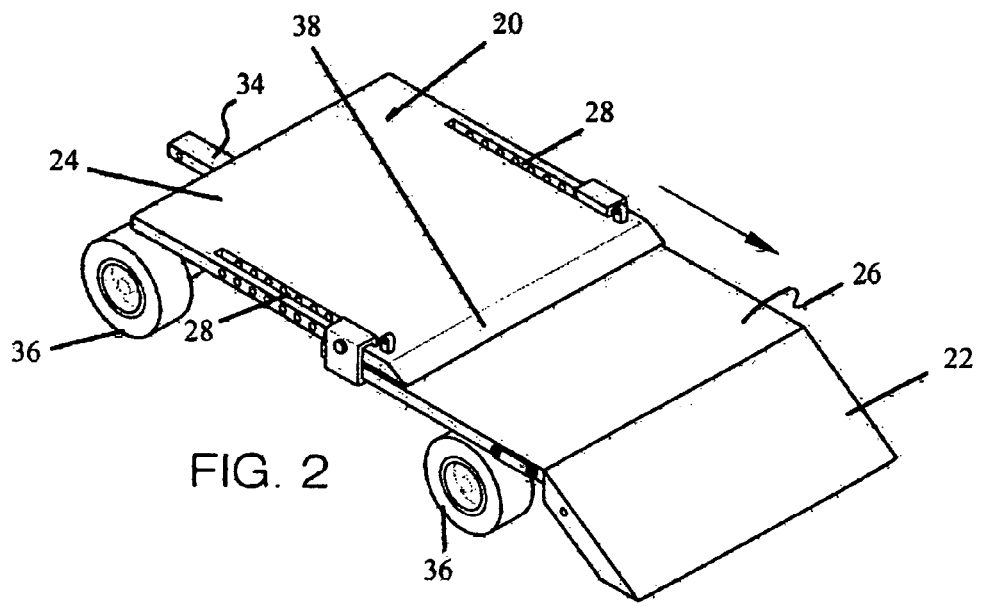
FIG. 2 is an isometric view of just the fold-up trailer of FIG. 1 showing the slidable bed portion being extended.

Turning to FIGS. 1 and 2, a motor vehicle 10 (of the recreational vehicle type) is shown with a fold-up trailer 20 of the present invention. The motor vehicle 10 includes the body 12, the bumper 14, and the hitch 16. The trailer 20 includes ramp 22, primary bed 24, secondary bed 26, extension adjustment 28, cable 30, winch 32, trailer tongue 34, trailer tires 36 and primary bed ramp 38.

Turning to FIG. 3, the trailer 20 is in the stored position and in close association with the body 12. In this view additional components can be seen such as the ramp hinge 40, the extension adjustment bracket 42, the extension adjustment bracket bolt 44, the wheel 46 and the suspension 48 and the axle 50. Another view in FIG. 4 shows the trailer 20 in the use position with a load 51 (pickup truck), with a load front 52 and a load rear 54, the ramp lock member 56, the ramp bevel 60 and ramp bottom 62. Also noted are the extension adjustment lock holes 66.

Figure 5:
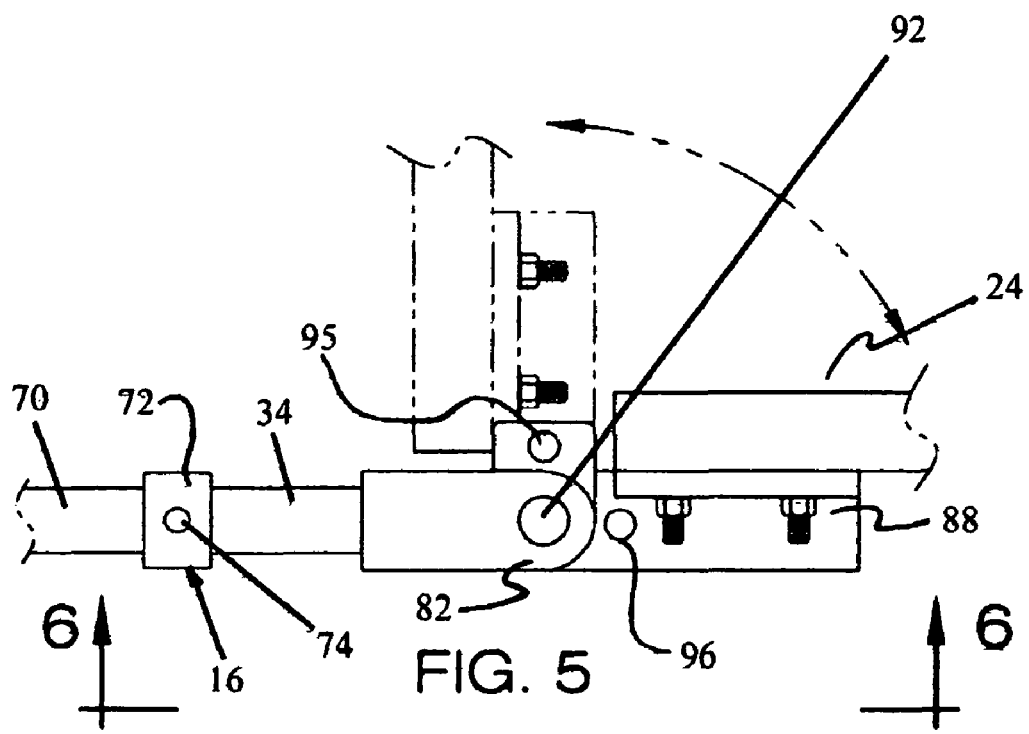
FIG. 5 is a side view of hitch portion and the trailer hinge portion of the present invention showing the rotation of the trailer beds about the hinge portion between the use position and the stored position (in phantom).
Figure 6:
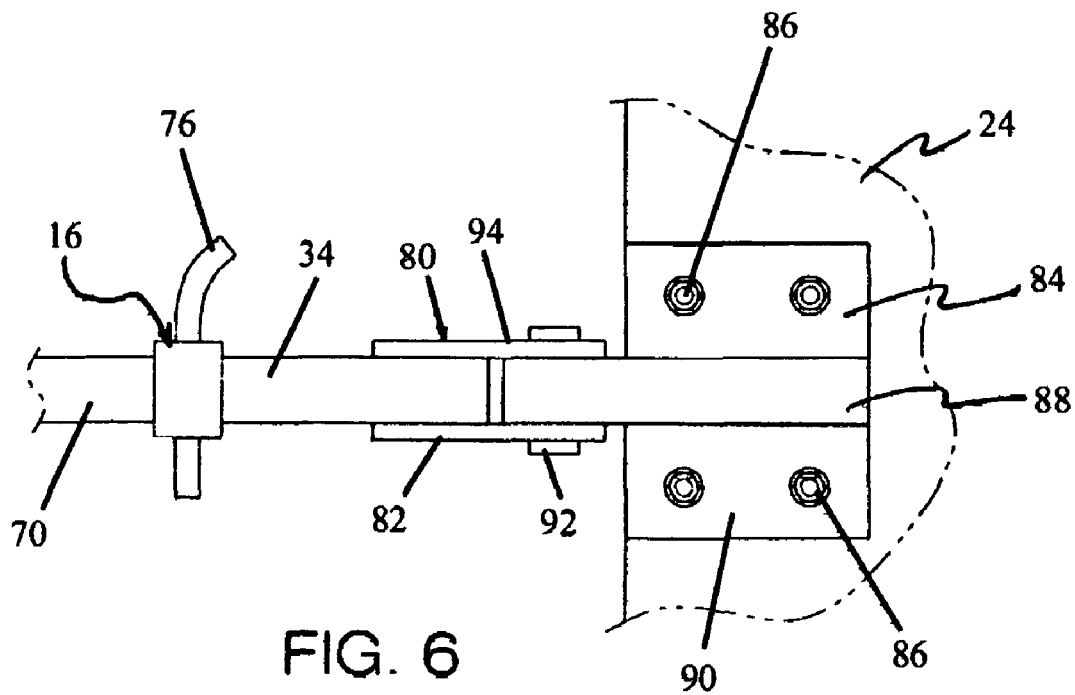
FIG. 6 is a top view of the hitch portion and the trailer hinge portion as shown in FIG. 5.

The views in FIGS. 5 and 6 are related and show details of the trailer 20 and its usage including the motor vehicle tongue 70, the hitch body 72, the hitch through-hole 74, and the hitch pin 76. On the trailer 20 is included the trailer hinge 80, the trailer hinge body 82, the trailer hinge bracket 84, the trailer hinge mounting bolt(s) 86, the trailer hinge bracket member 88, the trailer hinge bracket plate 90, the trailer hinge bracket pivot 92, the trailer hinge bracket yoke assembly 94 and the hinge lock 95 which corresponds to the hinge lock hole 96 which is located on the trailer hinge bracket member 88 and which aligns with the hinge lock 95 when the trailer 20 is tilted into the up position as shown in phantom in FIG. 5.

Figure 7:
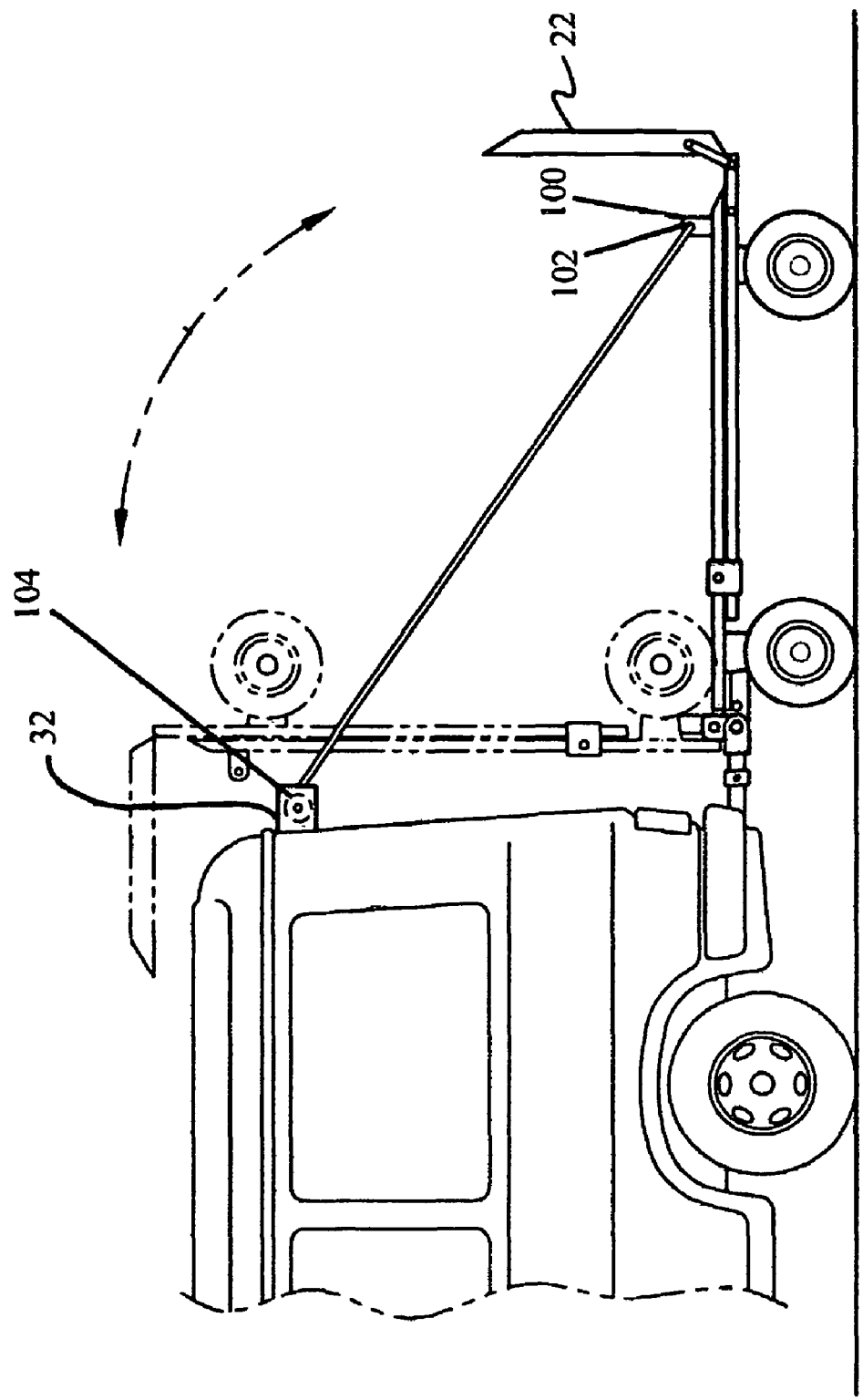
FIG. 7 is a partial side view of a motor vehicle with the fold-up trailer of the present invention installed thereon, showing the fold-up trailer of the present invention transitioning between a use position and a stored position.

In FIG. 7 the usage of the trailer 20 is shown between the use position and the stored position (in phantom). The cable mount 100 can be seen as well as the cable end 102 and the winch motor 104 (in phantom).

Figure 8:
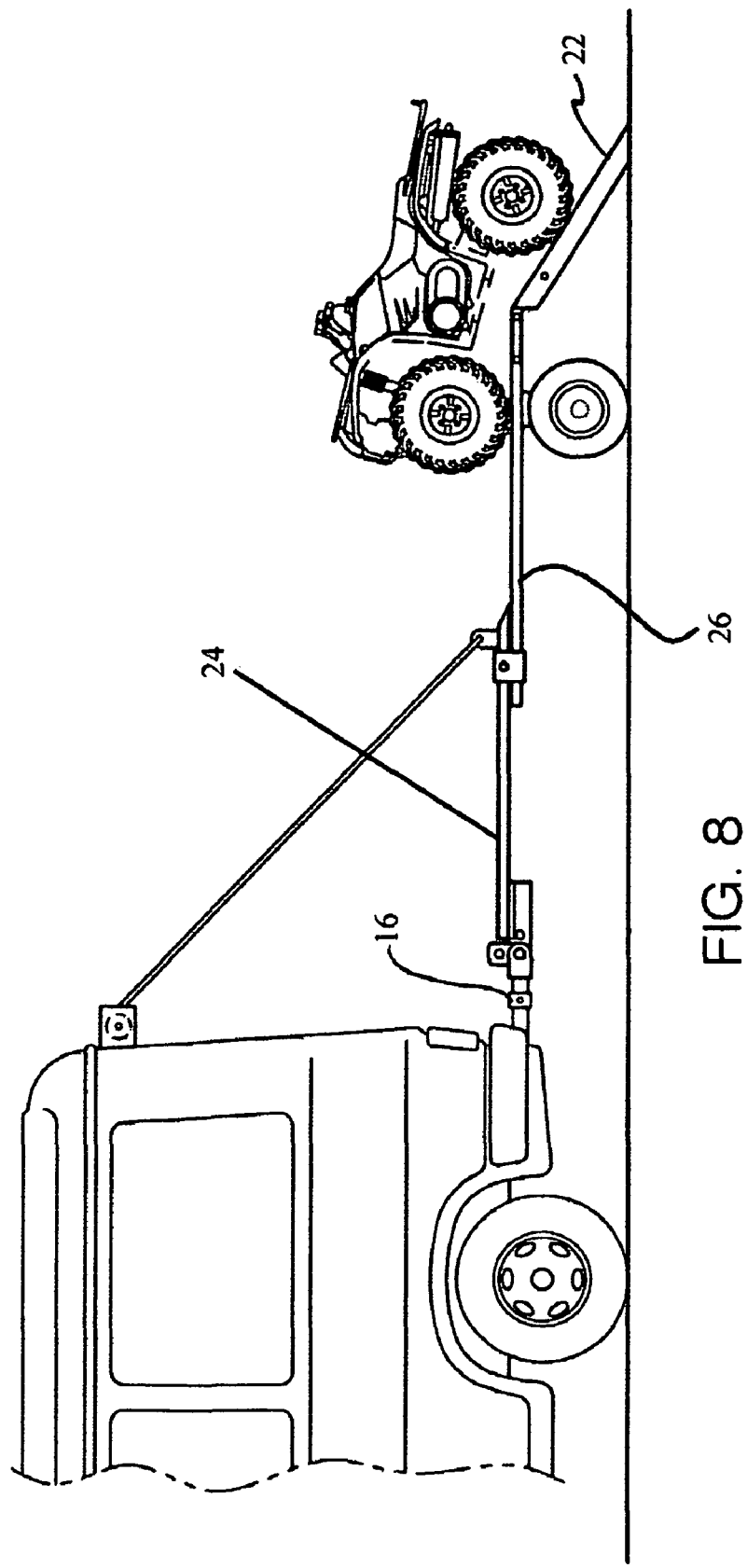
FIG. 8 is a partial side view of a motor vehicle with the fold-up trailer of the present invention installed thereon, showing the fold-up trailer of the present invention in the use position and with the slidable bed in an extended position and with the ramp extended for use and with an ATV being loaded onto the slidable bed.
Figure 9:
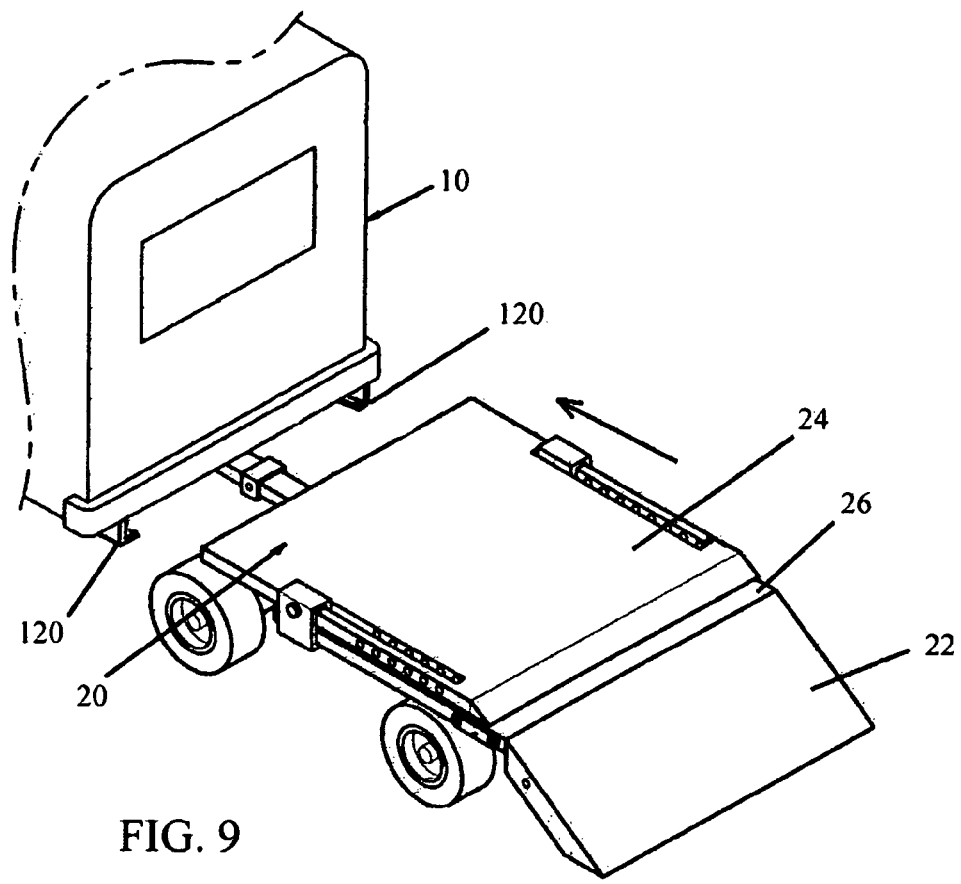
FIG. 9 is an isometric view of the motor vehicle and an alternate version of the trailer of the present invention, including opposing channels mounted onto the undercarriage of the motor vehicle.
Figure 10:
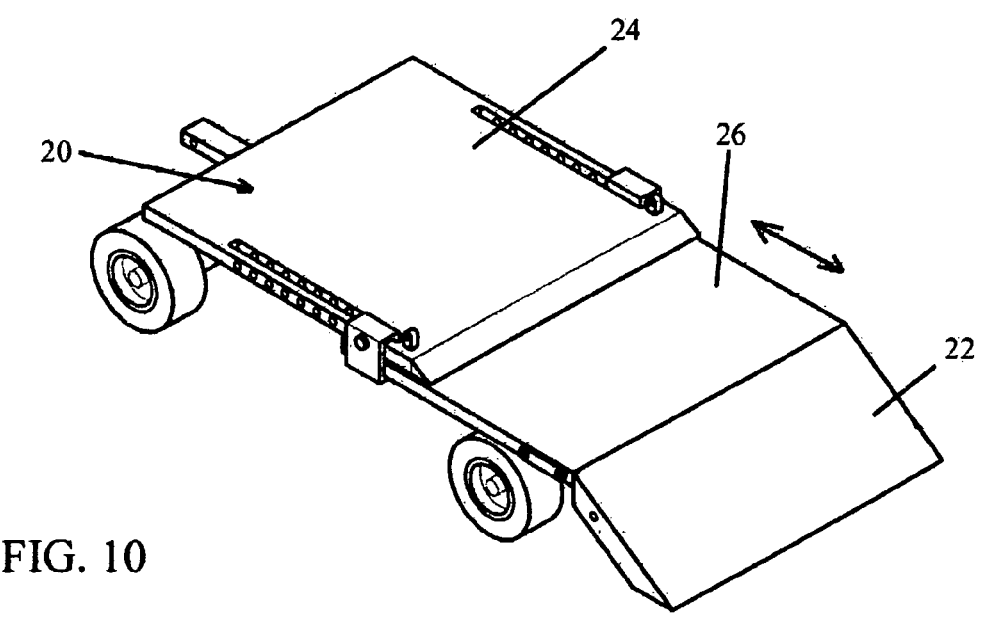
FIG. 10 is an isometric view of the trailer of FIG. 9 showing the movement of the secondary bed relative to the primary bed.
Figure 12:
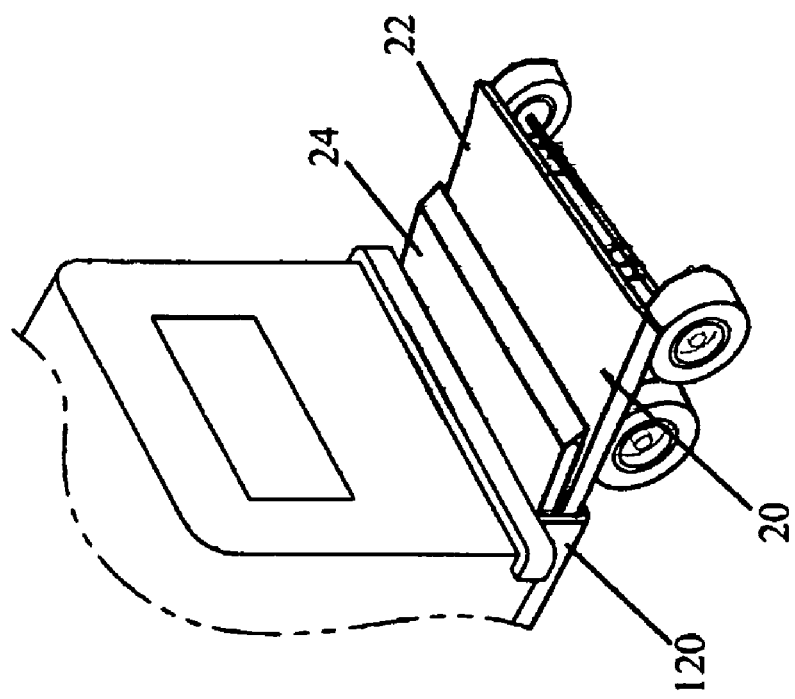
Figure 11:
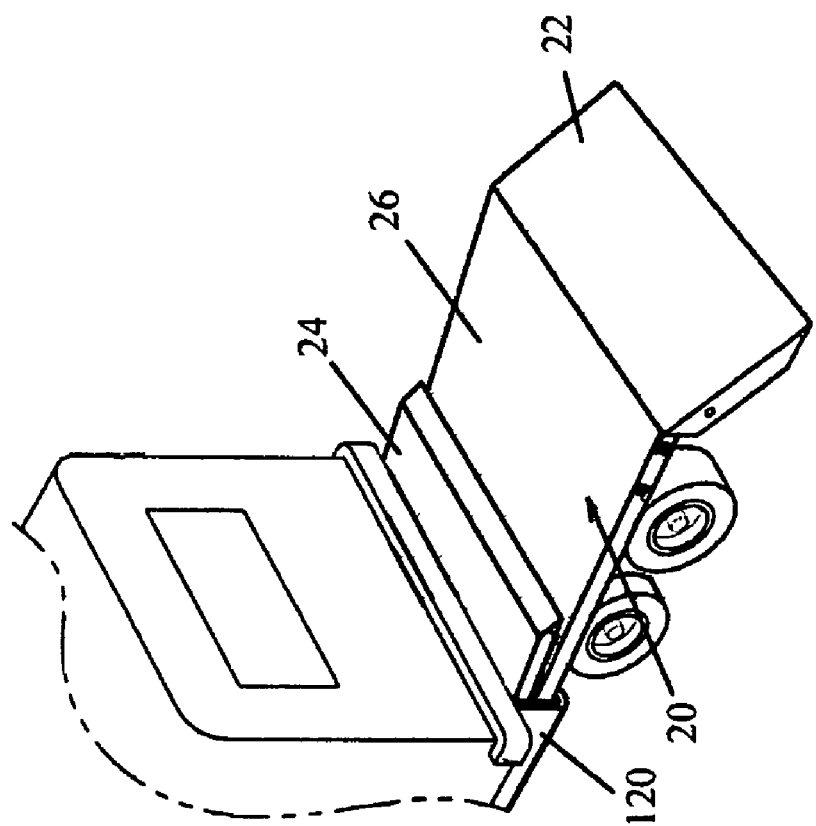
FIG. 11 is a partial isometric view of the motor vehicle and the trailer of the alternate embodiment, showing the primary bed having been moved forward and into a stored position underneath the motor vehicle.

Lastly, in FIG. 8 the same side view is shown with the trailer 10 shown in the use position. The slidable bed components, the primary bed 24 and the secondary bed 26 are shown as extended in order to accommodate the load 10, which in this case is an ATV. The ramp 22 is deployed for this purpose and displays how ramp bevel 60 accommodates the angle needed for the ramp 22 to land on the ground in a substantially level condition.

In use, the fold-up trailer of the present invention provides a robust bed for use in carrying loads. The bed is actually a slidable bed which is comprised of the primary bed and the secondary bed. The primary bed and the secondary bed are joined together by the extension adjustment mechanism which is a series of the extension adjustment lock holes that align with the through-holes that allow for locking engagement with the extension adjustment extension bracket bolt. The engagements occur on both sides of the slidable bed and allow for incremental adjustments to be made as to how far the secondary bed can be extended. Once it is brought to the desired length, the adjustment is made fast through the engagement of the extension adjustment bracket bolt, and the relationship between the primary bed is maintained by the extension adjustment bracket which is fixed thereafter between the primary bed and the secondary bed.

The slidable bed, once adjusted, is affixed to the ramp which can be deployed as shown in the drawings to allow loading. The ramp includes a ramp lock member which can be used to hold the ramp in fixed positions, such as when loading or when the trailer is in the stored position, or when the trailer is loaded and the ramp is maintained in an "up" position and acts like a tailgate in this regard. The ramp lock member is simply a lock bar that fits in related ramp lock member holes and is sufficiently robust to prevent the ramp from moving. The primary bed also includes a ramp portion that assists in the loading process as well. The present trailer and slidable bed are unusually robust as compared to the prior art devices thus loads such as vehicles, ATVs, and the like can be handled. Once loaded, the trailer can be hitched to the motor vehicle through the insertion of the trailer tongue into the hitch. The manner of interconnection at the hitch and the trailer tongue is a matter of convention with the hitch pin used to secure the tongue inside the hitch body, although the trailer hinge represents a unique aspect of the present invention. The trailer hinge, as can be appreciated from the drawings, rotates or pivots about the trailer hinge bracket pivot as can be seen in FIG. 5. This function allows the trailer to transition between the use position and the stored position. A safety provision can be included such as the hinge lock which comprises a through-hole that can be used to align with lock brackets (not shown) to secure the slidable bed in the use position when needed and in the stored position when needed. This lock-out approach is of the conventional type and is left to one skilled in the art.

Once the trailer has been loaded, and once it has been hitched to the motor vehicle is free to transport the trailer and load in a normal and conventional manner. The use certainly has to deal with an overall longer assembly when driving, however this is understood inasmuch it is a consequence of using a trailer in the first instance. However, when the user reaches the destination where the load is to be discharged (accomplished in the reverse manner as described for loading) the trailer is now empty and a nuisance in terms of further driving, maneuvering and parking. The solution is to convert the trailer to the stored position which is done through three steps: retracting the slidable bed, lock the ramp in the "up" position, and to transition the slidable bed to the stored position. With respect to the first two steps the procedure for accomplishing these functions has been explained above. With respect to the transitioning of the slidable bed, it is necessary to unlock the bed at the trailer hinge (if necessary)

and then to activate the winch(es) which will then commence to bring in the cable which by attachment to the slidable bed will cause the slidable bed (and related assembly) to be lifted to the stored position. It is preferred that dual winches are used to ensure a balanced transitioning of the slidable bed although it is possible that a single winch could be deployed. With the ramp in the up position, it is held closely around the body of the motor vehicle.

An alternate embodiment of the present invention is depicted in FIGS. 9 through 12. The basic folding trailer 20 remains the same although opposing channels 120 are mounted to the undercarriage of the RV 10. The channels 120 are aligned to receive the primary bed 24 and the secondary bed 26 as they are slid towards the RV. Each of the beds can be partially housed in telescopic fashion underneath the RV in this manner. It is understood that the suspension and other RV components limit the amount of clearance that can be obtained in this fashion thus requiring in some instances that a portion of the trailer beds be left extending from the rear of the RV. The beds would be fixed in the stored position through the use of the extension adjustment lock holes 66 which can be aligned with a similar lock hole (not shown) provided in the channels. In use the primary bed 24 is first detached from the trailer hinge bracket plate 90 allowing it to be moved forward of the trailer hitch 16. The secondary bed 26 is then moved forward as well and is retained to the primary bed through the adjustment extension bracket 42.

The trailer of the present embodiment is storable without the use of a winch or other mechanical means. It can be modified further if the RV is customized to allow clearance within the undercarriage so the trailer can be fully stored underneath, where such customization would require a re-working of the suspension system and other components of the RV.

The trailer of the present invention is surprisingly strong and provides a higher duty of service than folding trailers of the prior art. It also is very compact and results in a snugger fit than those folding trailers that are based on a frame construction. The transitioning of the slidable bed from the use position to the stored position can be done remotely through the use of controls mounted in the motor vehicle (in this case shown as an RV) or through a wireless remote control, or both. The slidable bed is also put to best service when it is adjusted to fit the load which maximizes control over the load when traveling (rather than having a load unbalanced over an excessively long bed). Using less than the full length of the slidable bed also assists the driver of the motor vehicle making the motor vehicle and trailer easier to drive and park.

Much of the components of the present invention can be gained as off-the-shelf equipment, for instance, the suspension, wheels and tires are of a conventional mode, the hitch assembly can be of a conventional type, and so on. Variations on the components as suggested herein can be anticipated and are within the scope of the invention.

I claim:

1. A trailer with at least a first set of wheels and a second set of wheels, tires and suspensions, for use in hauling loads behind a motor vehicle with a trailer hitch located at the rear of the motor vehicle, where the trailer is a fold-up trailer comprising:

A tongue extending from the trailer and interconnectable with the trailer hitch;

A trailer hinge for rotatable action as between the trailer and the motor vehicle for transitioning the trailer between a use position and a stored position;

An extendable slidable bed horizontally disposed above and supported by the wheels, tires and suspensions, that extends to a lockable length to accommodate various loads where said extendable slidable bed is extendable to a use position and retractable to a stored position where the extendable slidable bed length is minimized in the stored position;

Wherein the at least first set of wheels is positioned under the trailer in close proximity to the tongue so as to contact a round surface when the trailer is pivoted to the stored position;

A ramp affixed to a rear end of the slidable bed for use in assisting with loading loads; and At least a winch and a cable where said cable is connected between said winch and said extendable slidably bed to provide powered lifting of the extendable slidable bed between a user position and a stored position.

2. The trailer of claim Number 2, where the extendable slidable bed includes a primary bed and secondary bed held in close association and where the secondary bed is incrementally adjustable.

3. The trailer of claim Number 1, where the ramp includes a ramp lock for locking the ramp into a position.

4. The trailer of claim Number 1, where the trailer includes two winches for balanced lifting.

5. A trailer with at least a first set of wheels and a second set of wheels, tires and suspensions, for use in hauling loads behind a motor vehicle with a trailer hitch where the trailer hitch is located at the rear of the motor vehicle, and where the trailer is a fold-up trailer comprising:

A tongue extending from the trailer and interconnectable with the trailer hitch;

A trailer hinge for rotatable action as between the trailer and the motor vehicle for transitioning the trailer between a use position and a stored position;

An extendable slidable bed horizontally disposed above and supported by the wheels, tires and suspensions, that extends to an end length to accommodate various loads where the extendable slidable bed includes a primary bed and secondary bed held in close association and where the secondary bed is incrementally adjustable and lockable, and where said extendable slidable bed is extendable to a use position and retractable to a stored position where the extendable slidable bed length is minimized in the stored position;

Wherein at least the first set of wheels is positioned under the primary bed in close proximity to the tongue so as to contact a ground surface when the trailer is pivoted to the stored position, the at least second set of wheels is positioned under the secondary bed so as to not contact the round surface when the trailer is pivoted to the stored position;

A ramp affixed to a rear end of the extendable slidable bed for use in assisting with loading loads; and At least a winch and a cable where said cable is connected between said winch and said extendable slidably bed to provide powered lifting of the extendable slidable bed between a user position and a stored position.

6. The trailer of claim Number 5, where the ramp includes a ramp lock for locking the ramp into a position.

7. The trailer of claim Number 5, where the trailer includes two winches for balanced lifting.

* * * * *